United States Patent
Becker et al.

(10) Patent No.: US 6,857,702 B2
(45) Date of Patent: Feb. 22, 2005

(54) FORWARDLY DISPLACEABLE VEHICLE SEAT WITH ACCESS TO A REAR SEAT THROUGH A FRONT DOOR

(76) Inventors: Burckhard Becker, Obenkatternberg 25, 42655 Solingen (DE); Robert Houston, Landrat-Trimborn Str. 79, 42799 Leichlingen (DE); Kornel Zalavari, Düsseldorfer Strasse 92, 42697 Solingen (DE)

( * ) Notice: Subject to any disclaimer, the term of this patent is extended or adjusted under 35 U.S.C. 154(b) by 0 days.

(21) Appl. No.: 10/273,777

(22) Filed: Oct. 18, 2002

(65) Prior Publication Data

US 2003/0080598 A1 May 1, 2003

(30) Foreign Application Priority Data

Oct. 19, 2001 (DE) .......................................... 101 51 762

(51) Int. Cl.$^7$ ................................................ A47C 1/02
(52) U.S. Cl. ..................... 297/341; 297/344.1; 297/346
(58) Field of Search ............................ 297/344.1, 340, 297/341; 296/65.13, 65.14, 65.16; 248/429, 430

(56) References Cited

U.S. PATENT DOCUMENTS

| | | | |
|---|---|---|---|
| 4,615,551 A | * 10/1986 | Kinaga et al. | 297/341 |
| 4,666,208 A | * 5/1987 | Tatematsu et al. | 297/341 |
| 4,742,983 A | * 5/1988 | Nihei | 248/429 |
| 4,973,104 A | * 11/1990 | Nakayama et al. | 297/341 |
| 5,352,019 A | * 10/1994 | Bauer et al. | 297/341 |
| 5,626,392 A | * 5/1997 | Bauer et al. | 297/341 |
| 6,139,104 A | * 10/2000 | Brewer | 297/353 |
| 6,254,188 B1 | * 7/2001 | Downey | 297/341 |
| 6,439,531 B1 | * 8/2002 | Severini et al. | 248/423 |
| 6,513,868 B1 | * 2/2003 | Tame | 297/341 |
| 6,520,581 B1 | * 2/2003 | Tame | 297/336 |
| 6,616,233 B1 | * 9/2003 | Debus et al. | 297/341 |
| 6,631,952 B1 | * 10/2003 | Liebetrau et al. | 297/341 |
| 6,641,218 B2 | * 11/2003 | Ito et al. | 297/378.12 |
| 6,644,730 B2 | * 11/2003 | Sugiura et al. | 297/15 |
| 2003/0122412 A1 | * 7/2003 | Niimi et al. | 297/341 |

* cited by examiner

*Primary Examiner*—Peter M. Cuomo
*Assistant Examiner*—Erika Garrett
(74) *Attorney, Agent, or Firm*—Akerman Senterfitt

(57) ABSTRACT

A forwardly displaceable vehicle seat for vehicles in which a rear seat is accessed through a side door. A locking device (40) is assigned to the seat back joint (32) and locks the seat back joint (32) in a first locking position in a normal use position of the vehicle seat. A release (42), preferably arranged on the seat back (20), cooperates with the locking device (40), and permits displacement of the vehicle seat from the normal use position into a forwardly displaced position having the seat back (20) folded forward. A first transmission mechanism (54) sets a memory unit (78) and releases a stop unit (70) when the seat back (20) is tilted forward. The locking device (40) has a second locking position in which the seat back (20) is retained in the forwardly tilted position. A second transmission mechanism (56) actuates the locking device (40) so that it cannot adopt the second locking position within a rear portion (100) of the travel distance of the seat, and can engage the second locking position within a front portion (102) of the travel distance.

9 Claims, 12 Drawing Sheets

FORWARDLY DISPLACEABLE VEHICLE SEAT WITH ACCESS TO A REAR SEAT THROUGH A FRONT DOOR

BACKGROUND OF THE INVENTION

The invention relates to a forwardly displaceable vehicle seat and is more specifically intended for vehicles in which a rear seat is accessed through a side door assigned to the vehicle seat, meaning, for so-called two door vehicles. The invention relates to such a vehicle seat with a seat back, with a seat carrier, with a seat back joint arranged between seat back and seat carrier, with a locking device assigned to the seat back joint and locking said seat back joint in a first locking position adopted in a normal position of use of the vehicle seat, with a longitudinal adjusting device provided with a stop unit and with a memory unit, with a release, which is preferably arranged on the seat back and is connected to, and cooperates with, the locking device, permitting to enable displacement of the vehicle seat from the normal position of use into a forwardly displaced position, a forward displacement consisting in folding forward the seat back which allows the vehicle seat to be displaced forward in its longitudinal adjusting device, and with a first transmission means which is disposed between seat back and longitudinal adjusting device and sets the memory unit on the one side and releases the stop unit on the other side when the seat back is tilted forward.

Such type vehicle seats are generally known in the art and U.S. Pat. No. 5,352,019 is referred to by way of example only.

In the prior art vehicle seat the memory unit adopts its memory position and the stop unit of the longitudinal adjusting device is released when the seat back is tilted forward at a sufficient angle. Normally, the seat back is locked. It can be tilted forward upon actuating the release.

The problem with the previously known forwardly displaceable vehicle seats of this type is the following: the seat back is not retained in its forwardly tilted position. It is advantageous for a passenger accessing a rear seat with the vehicle seat being forwardly displaced when the seat back is somehow fixed in a relatively low, forwardly tilted position. Then, the space giving passengers access to the rear seats is the largest possible and mounting the vehicle is comfortable.

SUMMARY OF THE INVENTION

This is where the invention comes to bear. It is the object of the invention to further develop the forwardly displaceable vehicle seat of the type mentioned herein above in such a manner that it is more comfortable and precise to handle. The seat back of the vehicle seat that has been forwardly displaced within the longitudinal adjusting device is to be fixable in the forwardly tilted position. But it also intends to make it possible to just briefly tip the seat back forward without the seat back being locked in the forwardly tilted position for the purpose of placing an object onto the rear seats for example.

In view of the forwardly displaceable vehicle seat of the type mentioned herein above, the solution to this object is that the locking device is provided with a second locking position in which the seat back joint is locked in such a manner that the seat back is retained in a forwardly tilted position and that there is provided a second transmission means which is arranged between locking device and memory facility and actuates the locking device in such a manner that the locking device is not capable of adopting the second locking position within a portion of the travel distance of the seat located at the back, starting from the normal position of use, and that the locking device is allowed to engage into a second locking position within a front portion of the travel distance.

When the vehicle seat of the invention is displaced forward, meaning, when the seat back is tilted forward and the seat is slid forward in the longitudinal adjusting direction, the seat back is retained in the forwardly tilted position as soon as the displacement in the longitudinal adjusting direction is advanced so much that the front portion of the travel distance has been reached. Then, the seat back is locked by the seat back joint, which is in the second locking position. That is to say that it remains in its forwardly tilted position without any further assistance.

As a result thereof, access to a rear seat located behind the vehicle seat of concern is facilitated. It is no longer necessary, as this was usually the case in prior art, to use a hand in an effort to tilt the vehicle seat of concern as far to the front as possible and to keep it in this condition. Also, the stowage capacity is increased when bulky objects are to be transported on a rear seat.

The second locking position is not adopted, and, accordingly, the seat back not retained in its forwardly tilted position, until the vehicle seat has not been sufficiently displaced forward and is still in the rear portion of the travel distance. Said rear portion of the travel distance is preferably considerably shorter than the front portion. A user can just briefly tip forward the seat back of the vehicle seat of concern when he wants for example to place an object onto the rear seat located behind the vehicle seat of concern. In this case, the seat back is not yet retained in its forwardly tilted position. Accordingly, the seat back may be tilted back immediately after having been tilted forward without having to actuate the release or the like.

Accordingly, the seat back is only retained in its forwardly tilted position when the vehicle seat has really been sufficiently displaced forward within the longitudinal adjusting device. Without the vehicle seat being displaced forward, or when it has only been displaced a small distance, i.e., in the region of the rear portion of the travel distance, the locking device is not capable of adopting its second locking position and the seat back is not retained in the forwardly tilted position.

In actuating the release, the seat back is always released and the locking device always unlocked as a result thereof. This is irrespective of the fact of whether the locking device is in the first or in the second locking position.

If the release is actuated in the forwardly displaced position of the seat, the seat back may be tilted back to the normal upright position. Once this position is reached, the stop unit of the longitudinal adjusting device is actuated and the longitudinal adjusting device is locked into place.

If the user wants to bring the completely forwardly displaced vehicle seat, which, accordingly, is placed within the front portion of the travel distance, back to the normal position of use, he may either actuate the release or not do so to achieve the desired purpose. If he does not actuate the release, the seat back at first remains tilted forward while the seat is being displaced backward as long as it is caused to move within the front portion of the travel distance. However, upon reaching the rear portion of the travel distance, the locking device automatically releases the seat back and the second locking position is not used as a result thereof. Hence forward, a restoring force on the seat back not only causes the vehicle seat to be moved backward but also the seat back to be returned to its normal upright position until finally the vehicle seat is returned to its overall normal position of use. The locking device thereby automatically adopts its first locking position and the seat back is locked into the normal position of use as a result thereof as soon as the second locking position is released and the seat back has been tilted backward a large enough distance.

If however the release is actuated in any position of the seat within the front portion of the travel distance, the seat back may be folded up immediately and the locking device may adopt the first locking position. If the vehicle seat is located in the front portion of the travel distance and the seat back is locked into place in the second locking position of the locking device, the second locking position is always released by actuating the release.

The above mentioned considerations show that the vehicle seat is much more comfortable and easy to operate than a prior art vehicle seat. The additional locking of the seat back into a forwardly tilted position provides additional comfort without constituting an obstacle for the forward or backward displacement of the vehicle seat, though.

It has already been mentioned that it is advantageous to configure the rear portion of the travel distance to be considerably shorter than the front portion, the rear portion being more specifically configured to be at most 10%, preferably at most 5% of the overall length of the travel distance. In this way, it is possible to already lock the seat back into its forwardly tilted position after the vehicle seat has travelled but a short distance within the longitudinal adjusting device.

In a preferred embodiment the memory unit is provided with a catch rod which is slidably guided in a pivot member and is provided with a catch pin. The pivot member is pivotally arranged on a seat rail of the longitudinal adjusting device, is connected to the first transmission means and cooperates with the stop unit. The memory unit furthermore has a perforated bar adjacent the catch pin into which said catch pin may engage and which is connected to a bottom rail in engagement with the seat rail. The memory unit furthermore is provided with a sliding piece connected to the second transmission means. The catch rod is provided with a) a guide region for the sliding piece along which the sliding piece may slide relative to the catch rod and b) a rod catch for the sliding piece. A rail catch for the sliding piece is provided in proximity to the catch rod and is connected to the seat rail. The second transmission means is a Bowden cable that is arranged, at the one end region thereof, between sliding piece and rail catch.

Said memory unit is preferably suited for combination with the process of locking of the seat back into its forwardly tilted position in accordance with the invention. The actual distance the vehicle seat has travelled starting from its normal position of use is determined by the distance between the rod catch and the rail catch. The second transmission means transmits the detected distance between the two catches to the locking device. As a result thereof, said locking device is only capable of adopting the second locking position when the distance between the two catches has become small enough, provided the release was not actuated. The distance between the two catches is preferably adjusted to the length of the rear portion of the travel distance.

In another embodiment, the memory unit is provided with a catch cradle, a perforated bar and a lever arrangement. The catch cradle is arranged so as to be capable of travelling along the perforated bar and is provided with a catch peg which is elastically biased in a position of engagement by means of a peg spring. The perforated bar is connected to a bottom rail of the longitudinal adjusting device. The lever arrangement is disposed on a seat rail in engagement with the bottom rail. The lever arrangement is connected to the first and to the second transmission means. The lever arrangement cooperates with the stop unit and is provided with a driver lever that a) cooperates with the catch peg and actuates the same, and that takes the catch cradle along. Said memory unit constitutes an alternative embodiment to the already discussed solution with the rod, it operates with a slidable catch piece that is termed a catch cradle. It normally is connected to the stop unit of the longitudinal adjusting device and travels together therewith when the rails are slid relative to each other, that is, when the normal position of use is changed and adjusted. But if the seat back is tilted forward a large enough distance, the catch cradle is positioned onto the perforated bar so that the actual instant position of the longitudinal adjusting device is registered when the seat back is tilted forward.

In a preferred embodiment, the locking device of the seat back joint has a holding arm that is arranged on an arm of the seat back joint. There is provided a locking piece, which is arranged on the other arm of the seat back joint and is in engagement with the holding arm in the second locking position. The holding arm is connected to the second transmission means. Said holding arm is controlled by the distance the part of the memory unit engaging into the perforated bar, i.e., the catch cradle or the catch pin of the catch rod, is separated from the stop unit. This distance increases as the vehicle seat is being displaced further within the travel distance. As long as the vehicle seat is only displaced within the rear portion of the travel distance, holding arm and locking part are not capable of cooperating and the second locking position cannot be reached as a result thereof. The position of the respective travel distance is transferred to the locking device through the second transmission means.

Further advantages and characteristics of the invention will become apparent upon reading the remaining claims and the following non restrictive description of two embodiments thereof, given by way of example only with reference to the drawing.

DETAILED DESCRIPTION

Figure 8:
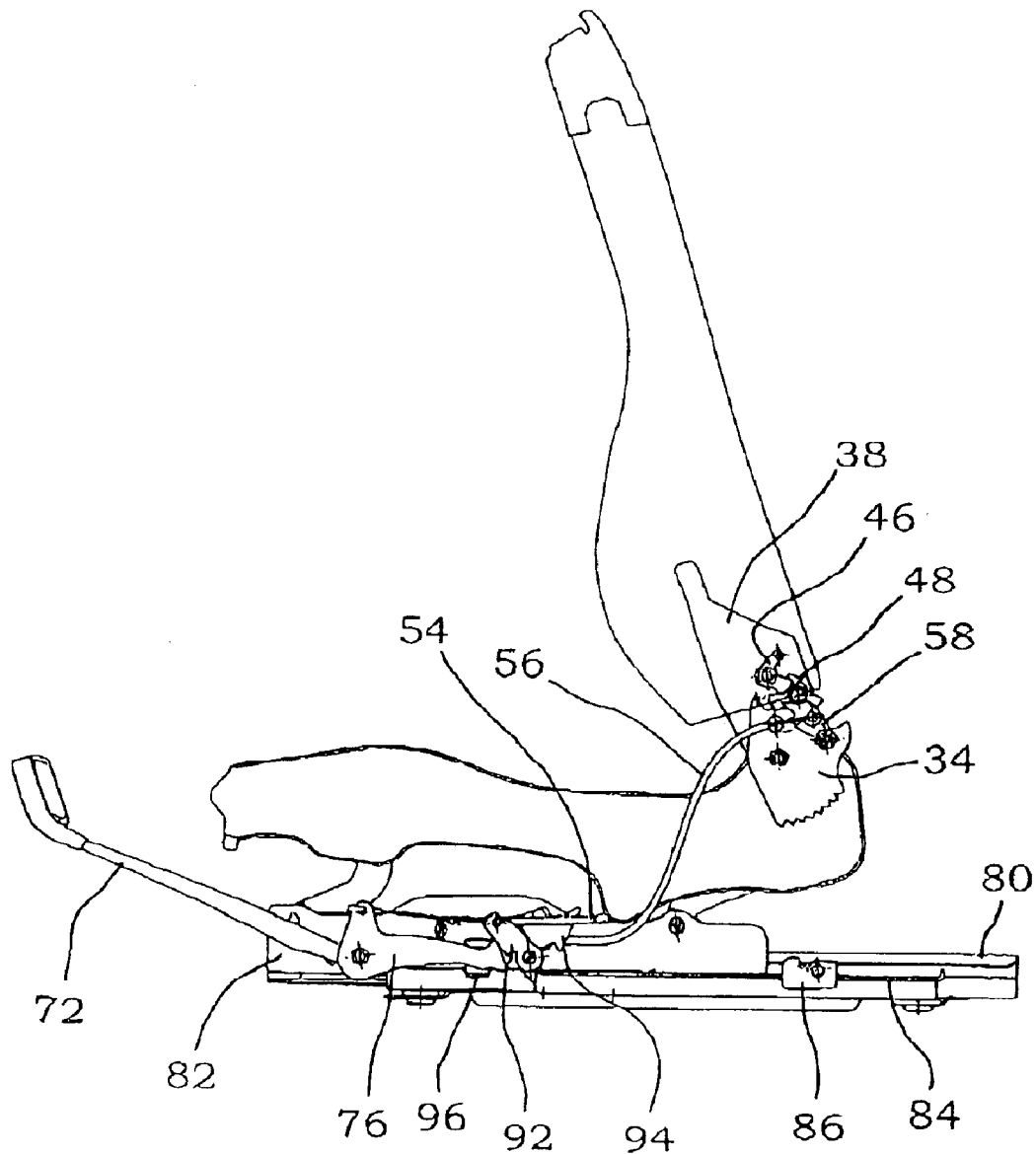
FIG. 8 is a view of the seat as in FIG. 7, the seat being now additionally displaced forward within the longitudinal adjusting device.

The first exemplary embodiment according to the FIGS. 1–9 will be discussed first. The FIGS. 1–6 show this seat in the normal position of use, FIG. 8 shows the forwardly displaced position, FIG. 7 an intermediate condition, i.e., the forwardly tilted seat back without the vehicle seat being displaced forward within its longitudinal adjusting device. The first embodiment operates with a catch cradle and will therefore be termed the cradle solution.

Figure 9:
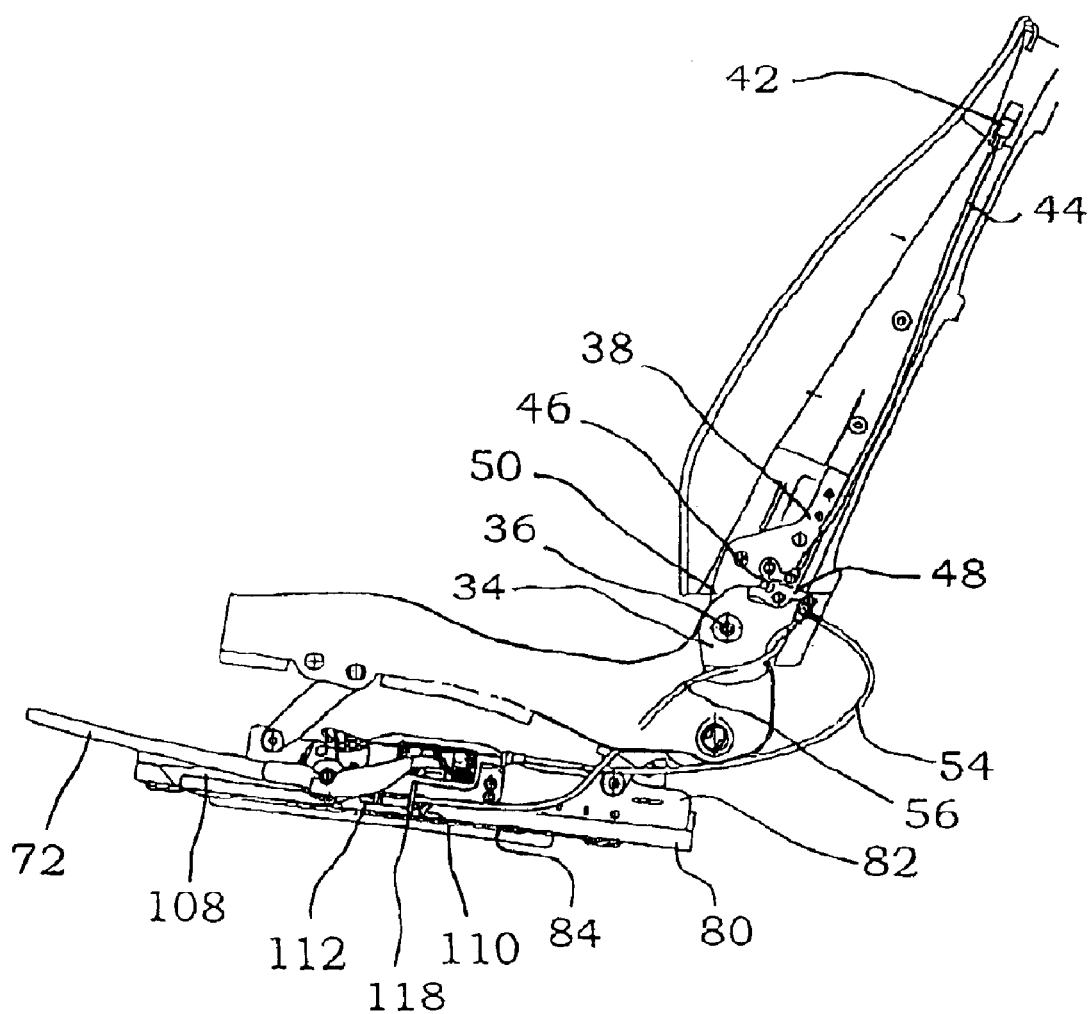
FIG. 9 is a side view of a seat of a second exemplary embodiment of the seat; again, the left couple of rails of the longitudinal adjusting device is not illustrated.
Figure 10:
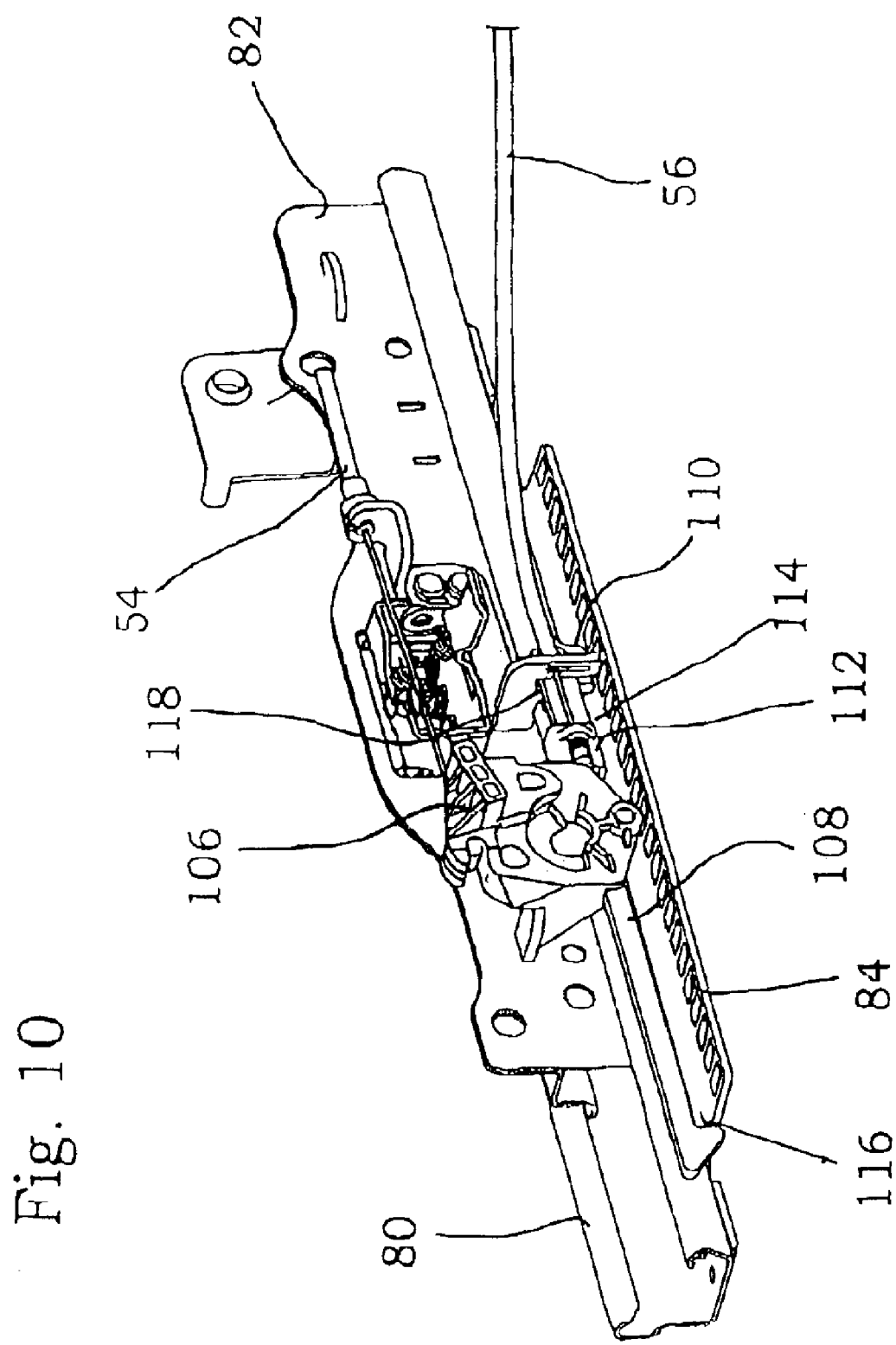
FIG. 10 is a perspective view of the right couple of rails of the vehicle seat of FIG. 9 with accessory parts.

The second exemplary embodiment is shown in the FIGS. 9–12. Here, a catch rod is utilized; therefore, the second embodiment will also be termed the rod solution. The FIGS. 9 and 10 show the normal position of use, FIG. 11 the seat with the forwardly tilted seat back without forward displacement and FIG. 12 the forwardly displaced seat.

The forwardly displaceable vehicle seat has a seat back 20 and a seat carrier 22 provided with a left side part 24 and with a right side part 30. The seat back 20 is connected to the seat carrier 22 through a seat back joint 32. A lower fitting part 34, which is connected to the seat carrier 22 in such a manner that it is pivotal about a pivot axis 36 of the seat back, belongs to the seat back joint 32. The angular position may be changed and fixed by way of a sector gear and additional means that have not been illustrated herein. An upper fitting part 38 is also arranged so as to be pivotal about the pivot axis of the seat back, it is durably connected to the seat back 20 or is integral part of a side frame part of the seat back 20. A locking device 40, which consists of several individual parts that will be discussed later, is arranged between the two fitting parts 34, 38. The locking device permits to join the two fitting parts 34, 38 together in the normal position of use of the vehicle seat so that these two parts are like one. On releasing the locking device 40, the seat back 20 may be tilted forward, the two fitting parts 34, 38 are thereby pivoted relative to each other. Finally, the seat back 20 may be locked in a forwardly tilted position by means of the locking device 40.

A release 42, which is located on a side part of the seat back in the upper region thereof, is provided on the seat back 20, see FIGS. 5, 9, 11 and 12. It is connected to a release arm 46 by way of a traction means 44, said release arm having two arms, being substantially L-shaped and pivotally hinge-linked to the upper fitting part 38. A holding arm 48, which is pivotally hinged to the upper fitting part 38 as well, is located in its range of movement. Said holding arm 48 cooperates with a locking part which is realized by a side 52 of a locking bight in the first exemplary embodiment. The locking part has a clamping area that contacts the side 52 preferably in the region of interlocking as the angle of the inward pivoting movement increases, this contact being shown in FIG. 3. The pivot travel path of the upper fitting part 38 is thus locked toward the front relative to the lower fitting part 34. To the back, the pivoting movement is locked by the holding arm 48 or its axle abutting on a second side of the locking bight, said second side substantially facing the side 52.

Figure 3:
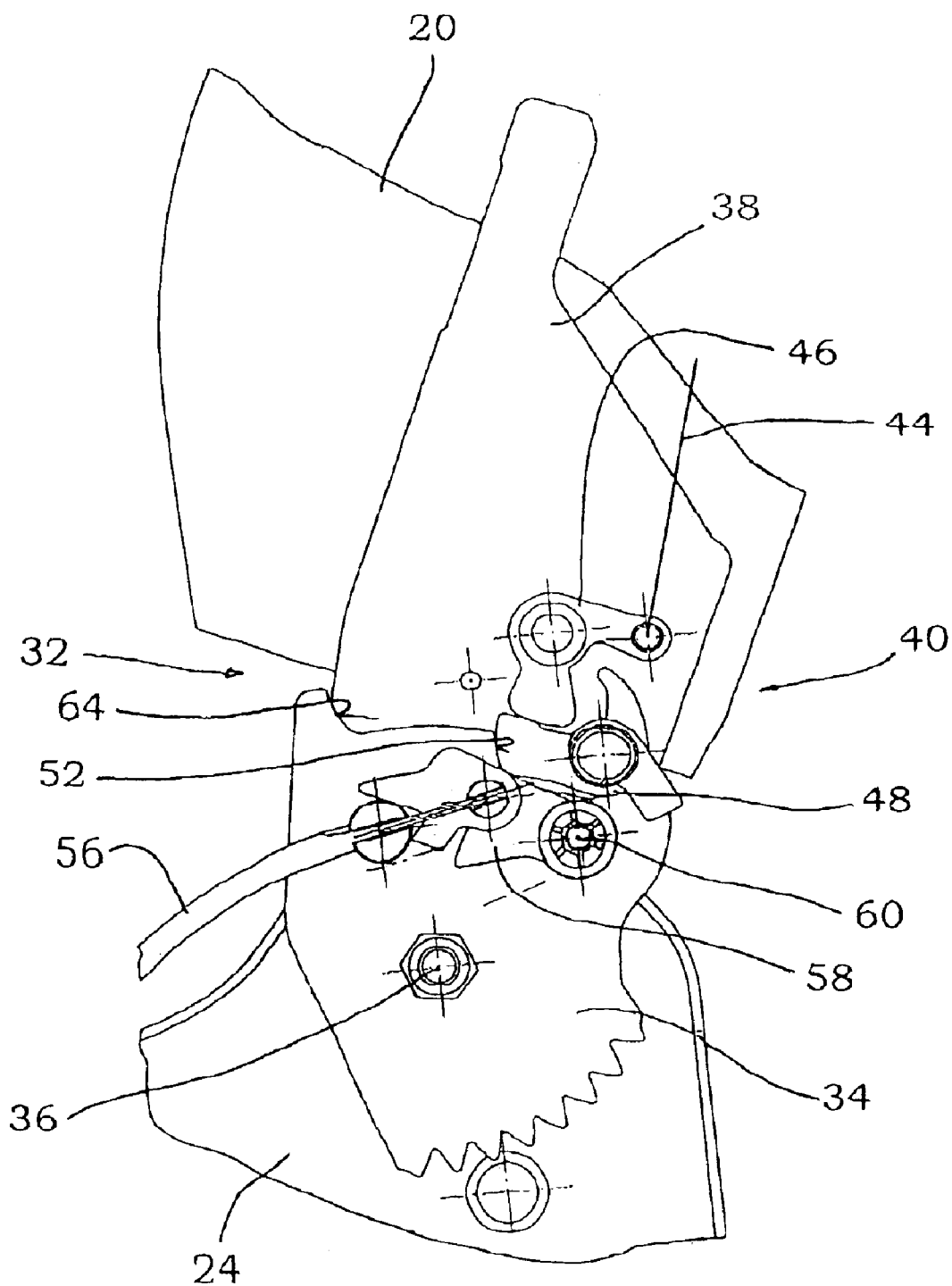
FIG. 3 is a view of the joint region between seat back and seat carrier shown according to the arrow III of FIG. 1.

In the normal position of use, see FIG. 3, the release arm 46 lies in the path of the holding arm 48 pivoting outward, it blocks the holding arm 48 in the locking position. If, however, the release arm 46 is pivoted counter-clockwise through the traction means 44 (FIG. 3), it strikes a release part of the holding arm 48 and causes the holding arm to pivot clockwise so that it is released from engagement with the side 52. Now, the seat back 20 may be tilted forward.

Figure 4:
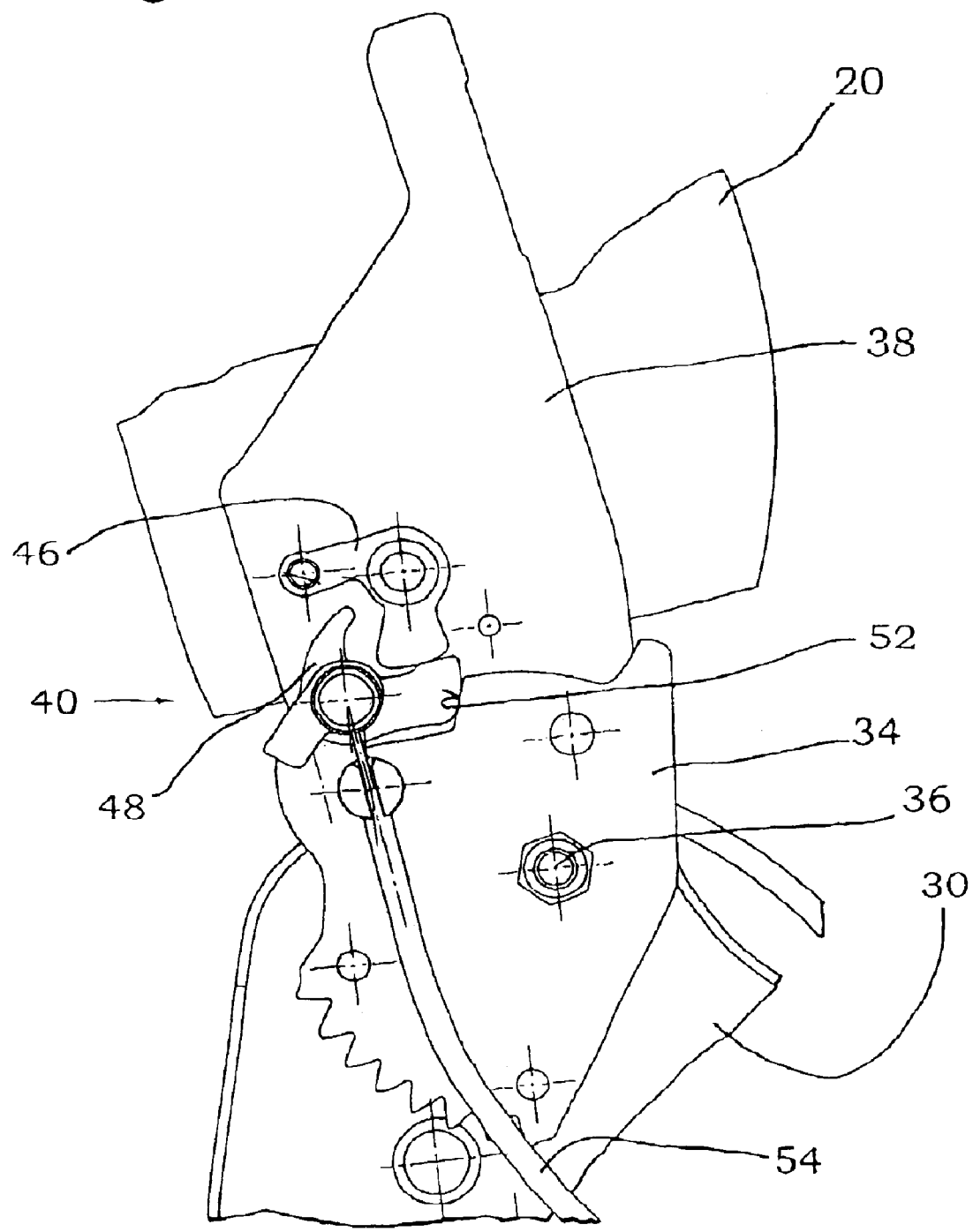
FIG. 4 is a view of the joint region between seat back and seat carrier on the opposite side of the seat according to arrow IV.
Figure 5:
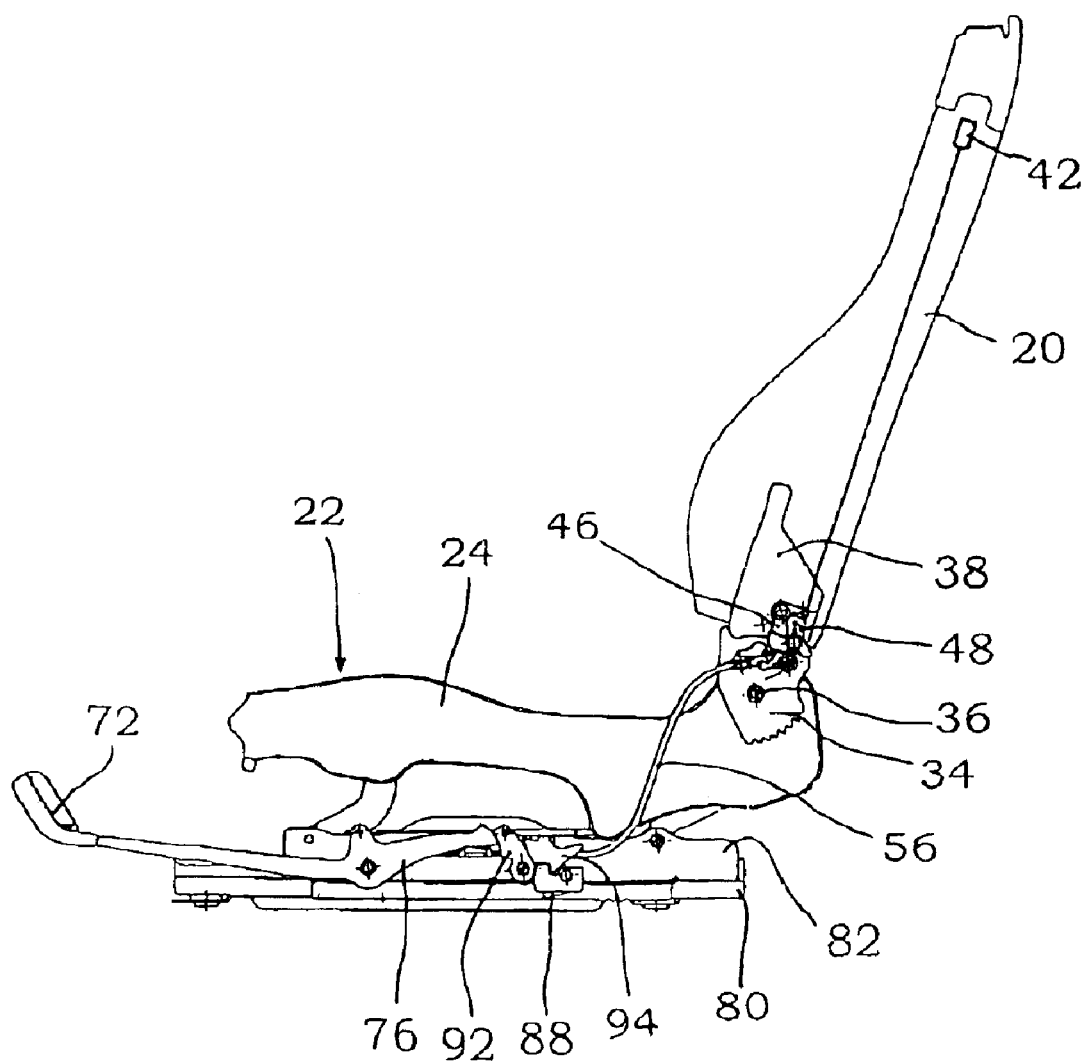
FIG. 5 is a simplified side view of the vehicle seat according to FIG. 1, the left couple of rails of the longitudinal adjusting device having been removed.

FIG. 4 shows the seat back joint on the other side of the vehicle seat. The two holding arms 48 of the two seat sides are non-rotatably joined-together through a rod. Accordingly, in the normal position of use according to the FIGS. 3 and 4, the two sides of the seat are in the first locking position.

On this second seat side which, in the exemplary embodiments, is the tunnel side, the core of a first transmission means, which is configured to be a Bowden cable, is fastened on the holding arm. The sheath of the associated end region of said first transmission means, or of said first Bowden cable 54, is fastened to an abutment which is arranged, preferably pivotally arranged, on the lower fitting part 34. It can be surveyed therefrom that the core is pulled out of the sheath to the extent to which the upper fitting part 38 is pivoted forward from the normal position of use shown, i.e., to which the seat back 20 is pivoted forward, to the right in FIG. 4. As soon as the distance travelled is sufficient, the vehicle seat may be displaced forward, which will be discussed later.

On the other side of the seat (FIG. 3), i.e., on the side of the door, there is provided a second transmission means 56 which is also configured to be a Bowden cable and which will be termed second Bowden cable 56 herein after. It is also arranged on, more specifically hinged to, the lower fitting part 34 on an abutment, which is built according to the same principle as the abutment already mentioned, and holds the sheath of the upper end region of said second Bowden cable 56. The core is arranged on a locking jaw 58 which is hinged to the lower fitting part 34 in such a manner that it is pivotal about an axis 60 of the jaw. It is preferably elastically spring-biased in the clockwise direction. In the position according to FIG. 3 it lies against the abutment of the second Bowden cable 56. When the core is sufficiently spaced from the abutment, the locking jaw 58 may pivot upward. It reaches the position according to FIG. 7 in which it has no effect yet. If, however, the vehicle seat is additionally displaced forward a sufficient distance, the locking jaw reaches the position according to FIG. 8 in which it is supported at its locking bight 62 by the pivot axis of the holding arm 48, thus locking the lower fitting part 34 relative to the upper fitting part 38. In this condition, the seat back 20 is locked in its forwardly tilted position, said position being termed the second locking position.

It may be released any time by actuating the release 42. If this happens, a third part of the holding arm 48 presses the locking jaw 58 back downward in the counter-clockwise direction so that the seat back may be tilted back again to the upright position.

The locking jaw 58 is configured to be a two-part buckle lever. It has an outer buckle lever part which is provided, on the free end thereof, with the locking bight 62, and an inner buckle lever. The two are hinge-linked together by a joint.

They are biased in the extended position by an elastic means (see FIG. 3 for example). The core of this second Bowden cable 56 is attached to the joint or in proximity thereto. If, in the second locking position, i.e., in the condition shown in FIG. 8, the core is pulled toward the sheath, the locking jaw 58 sags and the second locking position is released. Thanks to the buckle lever configuration, this unlocking can be performed with little force. This buckle lever configuration will be claimed separately.

It is also possible, possibly in addition thereto, to configure the locking bight 62 in such a manner that the seat back 20 may be tilted back by a sufficiently high force on the seat back and without actuating the release 42.

The pivoting forward movement of the seat back 20 is limited by a front side 64 realized on the lower fitting part 34. In its position according to FIG. 8, the seat back has not yet come into contact with said front side. It is therefore still possible to tilt the seat back slightly farther toward the front. This shows that the second locking position may be positioned anywhere within the range in which the seat back 20 is tilted forward.

The vehicle seat furthermore has a longitudinal adjusting device provided with a left couple of rails 66 and a right couple of rails 68. It furthermore is provided with a stop unit 70 for each couple of rails 66, 68, said stop unit being configured here to be a multiple pin stop unit actuating, through a hand lever 72 attached to a pivoting tie bar 74 connecting the two couples of rails 66, 68, release levers 76 of the two rail sides which are connected to said pivoting tie bar. Finally, the longitudinal adjusting device has a memory unit 78 which is only provided and arranged on one seat side. Said memory unit will be discussed in greater detail herein after.

The memory unit is assigned to the right couple of rails 68, which is located on the tunnel side. Said tunnel side has a bottom rail 80 and a seat rail 82. A perforated bar 84 of the memory unit is connected to the bottom rail. A catch cradle 86 is assigned to said perforated bar 84, is slidable relative to the perforated bar 84 in the longitudinal sliding direction and engages in a respective one of the holes in said perforated bar 84 in the memory position. The catch cradle 86 is deposited at the respective relative position of the longitudinal adjusting device at which the normal position of use is left before longitudinal displacement within the longitudinal adjusting device takes place.

Figure 6:
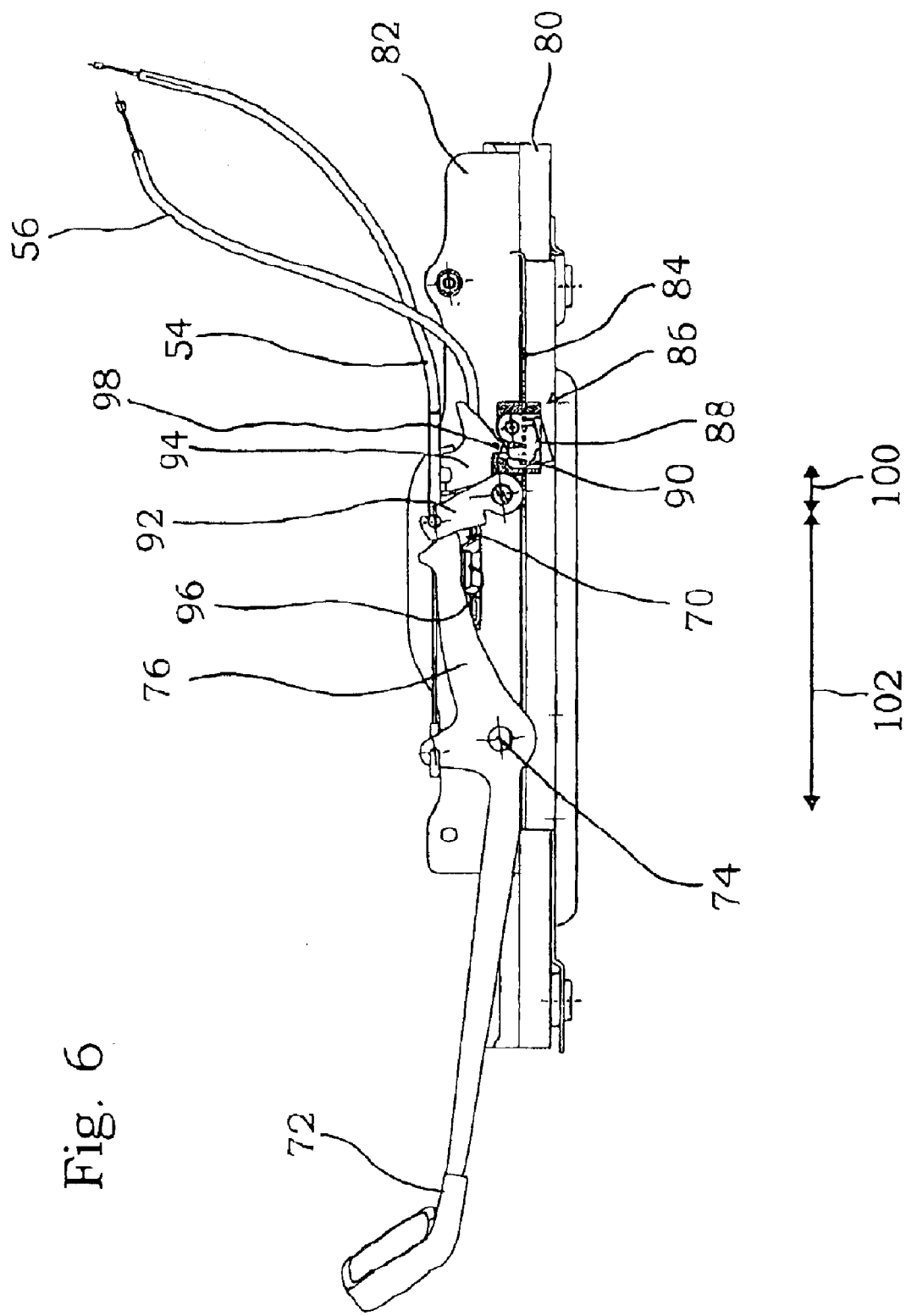
FIG. 6 is an enlarged, partially sectional, detail view of FIG. 5 showing the right couple of rails with the accessory parts of the longitudinal adjusting device.
Figure 7:
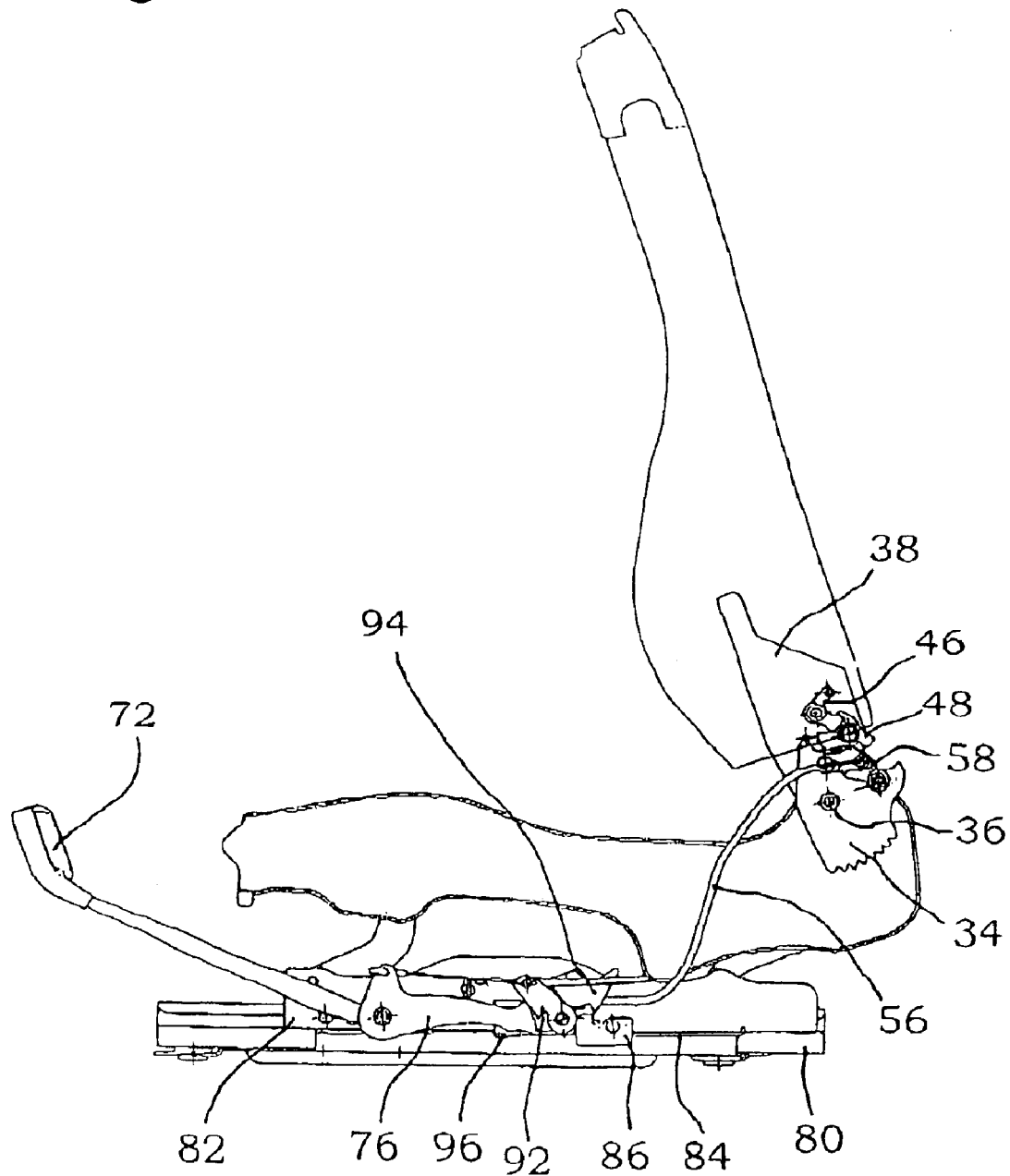
FIG. 7 is a view according to FIG. 5 but this time with the seat back being tilted forward but not displaced within the longitudinal adjusting device.

In the exemplary embodiment shown for example in FIG. 6, the catch cradle has an outer part and an inner part 88. The inner part 88 is fastened to the outer part so as to be pivotal about an axis. The outer part is slidable along the perforated bar 84 by which it is guided. The inner part 88 has a catch peg 90 capable of engaging into a hole of the perforated bar 84. For this purpose, the inner part is subjected to torsional load in the clockwise direction by way of a torsion spring (not shown) so that normally the catch peg 90 thereof engages into a hole of the perforated bar 84.

In the normal position of use as it is shown for example in FIG. 6 however, this engagement is prevented from taking place by a lever arrangement comprised of a stop lever 92 and a memory lever 94. The stop lever is hinged to the seat rail 82 so as to be pivotal about an axis and is provided with an abutment for the first Bowden cable 54. The corresponding core of the lower end of the first Bowden cable is fastened to the release lever 76 of the corresponding seat side at a distance from the pivoting tie bar 74.

If the seat back 20 is tilted forward, the distance between the free end of the core and the abutment in the lower end region of the first Bowden cable 54 is reduced. The release levers 76 are pivoted as a result thereof, their respective free ends press against an unlocking lever 96 of the corresponding stop unit 70. Said stop unit is unlocked as a result thereof.

A normal release of the stop unit involves the following steps: the hand lever 72 is pulled upward, causing the two release levers 76 to pivotally follow their movement, the stop units 70 of the two couples of rails 66, 68 are released.

The memory lever 94 is assigned to the stop lever 92 and is controlled by the latter. In the normal position of use, for example in FIG. 6, the stop lever 92 presses the memory lever 94 downward in such a manner that a dog 98 of the memory lever 94 exerts such a strong pressure onto the inner part 88 that the catch peg 90 remains out of engagement with the perforated bar 84 as a result thereof.

Figure 1:
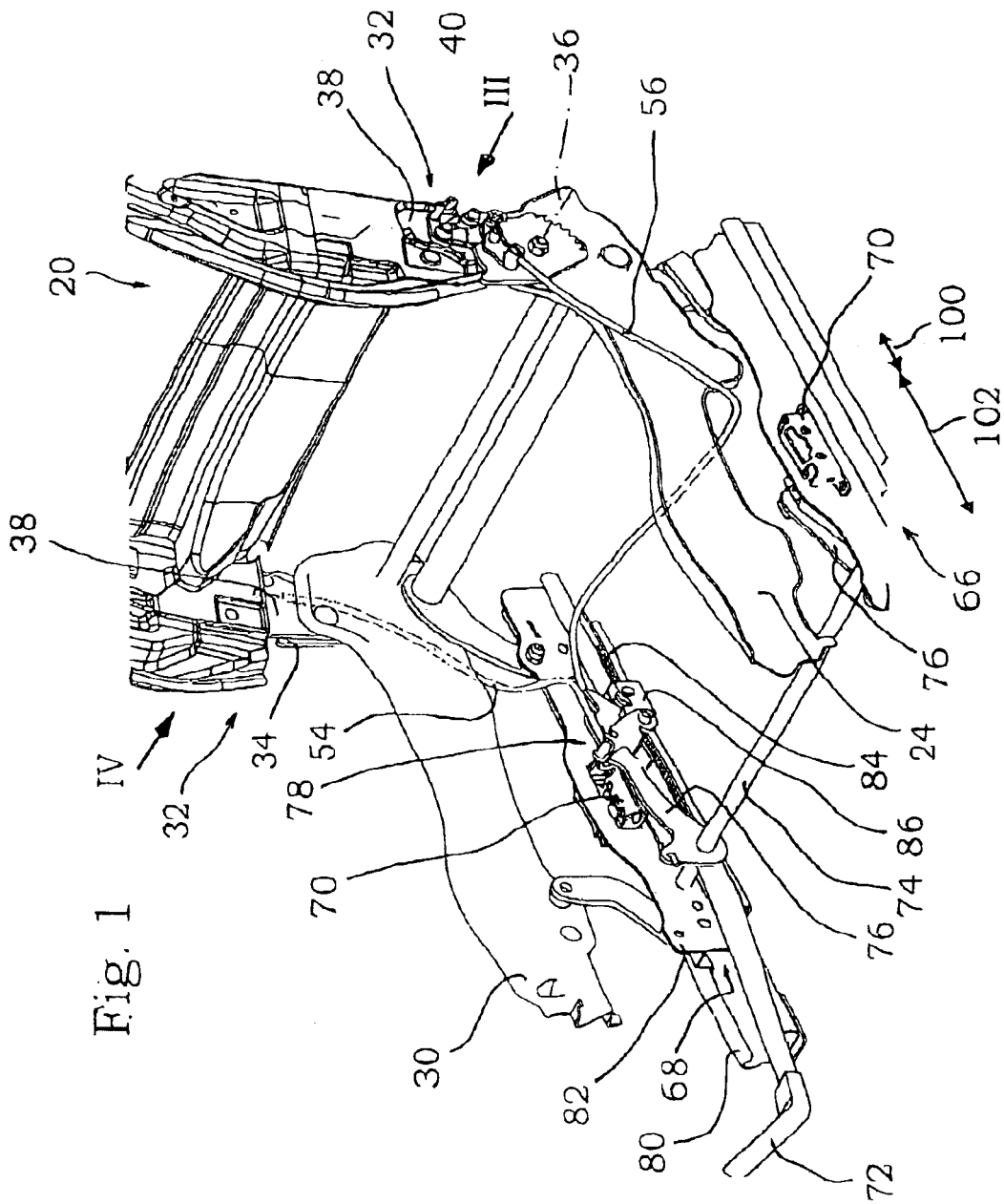
FIG. 1 is a perspective view of a seat frame of a vehicle seat according to a first embodiment of the invention.
Figure 2:
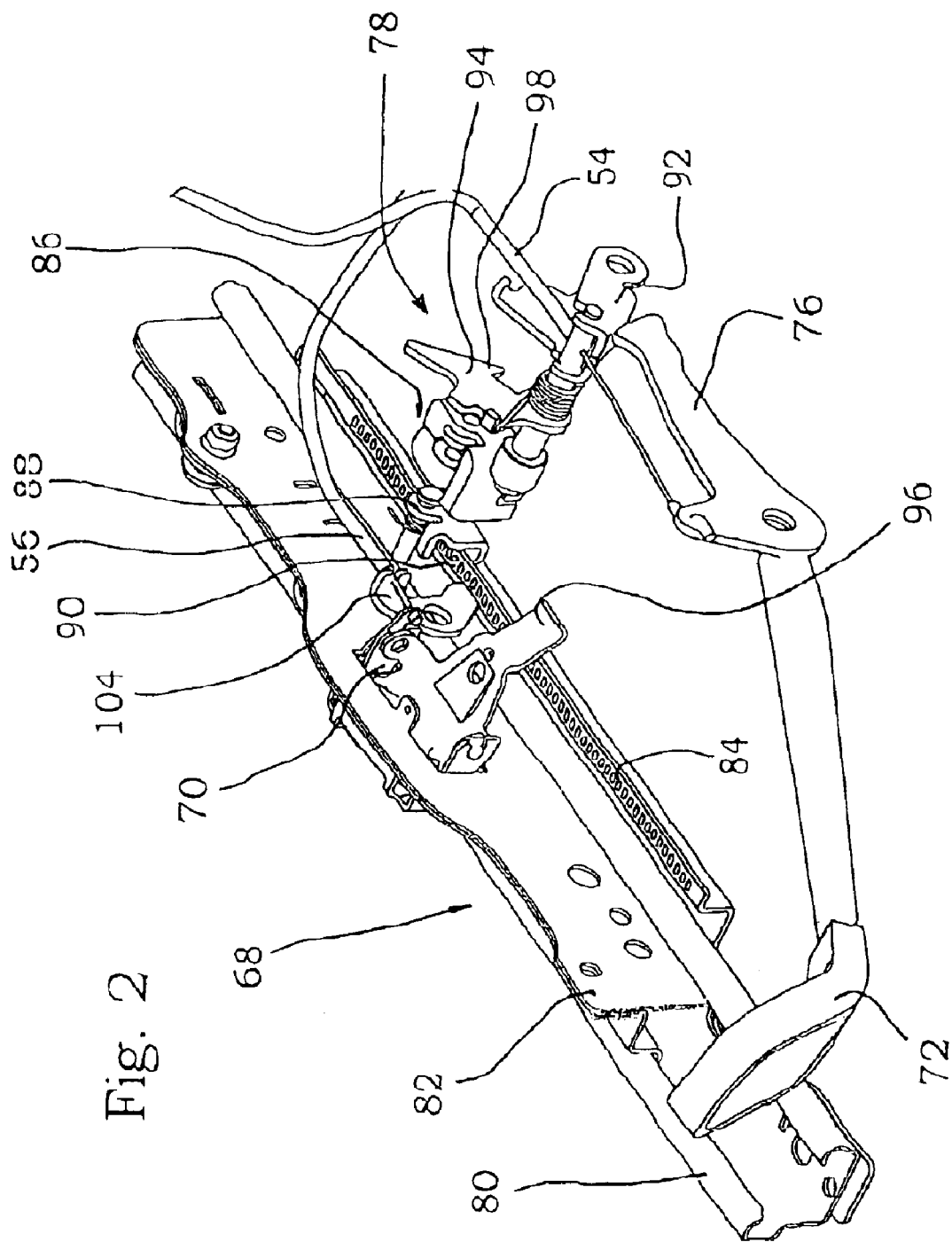
FIG. 2 is a perspective view in the form of an assembly drawing of a detail of FIG. 1 in substantially the same direction of viewing, substantially showing the right longitudinal adjusting device with the parts assigned thereto.

As shown in FIG. 2, the memory lever 94 is elastically biased by a torsion spring that rotates it in the clockwise direction. This causes the dog 98 thereof to exert a pressure onto the inner part 88 the catch peg 90 of which remains disengaged from the perforated bar 84.

This applies to the normal position of use of the vehicle seat. As soon as the first Bowden cable 54 is sufficiently actuated, i.e., as soon as the seat back 20 has been tilted forward at a certain angle, one of the sides of the release lever 76 supporting the stop lever 92 has moved so much downward that the stop lever 92 is capable of pivoting counter-clockwise (FIG. 6). The memory lever 94 follows this pivoting movement in the clockwise direction. The dog 98 thereof is thus disengaged from the inner part 88 so that the catch peg 90 is now capable of engaging into a hole of the perforated bar 84. The catch cradle 86 is now set. If now a longitudinal displacement occurs within the longitudinal adjusting device, the levers 92, 94 move increasingly away from the catch cradle 86, as may be seen in FIG. 8. If a forwardly displaced seat is slid back again to reach a normal position of use, the sequence of the steps described is reversed.

The dog 98 of the memory lever 94 has a rear oblique side. On sliding the seat back within the longitudinal adjusting device, the oblique side comes into contact with the outer part of the catch cradle 86, which causes the memory lever 94 to pivot. Said lever slips over the outer part and reaches, through the opening thereof, a position in which it is located above the inner part 88. The dog 98 may again reach the inner part and press it away in the downward direction into the position shown in FIG. 6. In this condition, the stop lever 92 is pivoted as far as possible in the clockwise direction, its pivot path is no longer blocked by the memory lever 94. As a result thereof, the release lever 76 may now also be capable of pivoting so far in the counterclockwise direction that the unlocking lever 96 is unloaded again, thus locking the stop unit. This applies to the two seat sides since they both have one release lever 76.

The second locking position has not been discussed yet. This position fits into the sequences described herein above in the following manner: the overall travel distance of the seat between the normal position of use and the maximum possible forwardly displaced position is divided in a rear portion 100 and into a front portion 102. It is detected in which portion thereof the vehicle seat is located and this information is transmitted to the locking device 40 through the second Bowden cable 56. For this purpose, in its lower end region, the second Bowden cable 56 is supported at its core on the seat rail 82 of the couple of rails situated on the side of the tunnel, this is performed here on a part of the stop unit 70. The corresponding sheath is fastened to an abutment realized on an upper arm of a sensing lever 104. Said lever is pivotally arranged on the seat rail 82 and has additionally a lower arm by which it is capable of abutting the outer part of the catch cradle 86. This abutment occurs in the normal position of use. As a result thereof, the free end of the core, in the lower end region of the second Bowden cable 56, is positioned at the greatest possible distance from the sheath of this Bowden cable. But if, upon actuation of the release 42 and unlocking of the stop units 70 of both seat sides, the seat rail 82 is displaced forward, the distance between the free end and the sheath of the lower end region of said Bowden cable 56 is reduced. As long as this happens within the rear portion 100 of the travel distance, it has no effect. As soon however as the front portion 102 of the travel distance is reached, the locking jaw 58 is pivoted in the clockwise direction (FIG. 3), starting from its initial position in which it is in the normal position of use and in which it abuts on the abutment of the Bowden cable 56, such a distance that it adopts the position shown in FIG. 8. Then, the second locking position described is possible or reached. Said position is maintained until either the release 42 is actuated or the seat is displaced so far backward that it is located within the rear portion 100 of the travel distance.

A torsion spring may be allocated to the sensing lever 10, said torsion spring biasing said lever in the counter-clockwise direction in FIG. 2.

It can be surveyed therefrom that the first Bowden cable 54 and the second Bowden cable 56 are guided toward different seat sides. The design of the seat back joints is simplified as a result thereof.

The second exemplary embodiment will now be discussed herein after. The differences over the first embodiment will be substantially emphasized: in this second embodiment, the seat back joint on both seat sides is of a different configuration than in the embodiment discussed herein above. It is possible to combine the embodiment discussed herein above with the embodiment according to the FIGS. 9–12. Furthermore, the memory unit in the second embodiment is configured in another way, a catch rod 108 is substituted for the catch cradle. It moreover has several additional component parts in the region of the longitudinal adjusting device. It is possible to combine the memory unit according to the second embodiment with the seat back joints according to the first embodiment.

Again, the release 42 is connected to an L-shaped release arm 42 by way of a traction means 44. Said traction means in turn cooperates with a holding arm 48 which, in the normal position of use, abuts at a head portion thereof, within the angle of interlocking, on a side 52 of a locking bight realized in the lower fitting part 34. Said head part forms a hook that cooperates with a locking part 50 of the lower fitting part 34 in the second locking position. Said locking part 50 is here configured to be a step.

If, starting from the normal position of use (FIG. 9), the release arm 46 is pivoted in the counter-clockwise direction (FIG. 9), it abuts on a portion of the holding arm 48 and drives it out of the locking position in which it is. The holding arm 48 is pivoted in the clockwise direction so that its head part is removed from engagement with the side 52, this condition being shown in FIG. 11. The hook of the head part is then located above the locking part 50 configured to be a step (FIG. 11), but it is not capable of cooperating with said locking part. The second Bowden cable 56 prevents the holding arm 48 from pivoting into the second locking position. This may only happen when, on the upper end region of the second Bowden cable 56, the core has been pushed out of the sheath to such an extent that the pivoting movement of the holding arm 48 toward the locking part 50 is enabled. Then, the position according to FIG. 12, in which the seat back is locked into the forwardly tilted position, is reached.

The memory unit according to the second exemplary embodiment will be described herein after. Again, a perforated bar 84 is connected to the bottom rail 80 of the right couple of rails on the side of the tunnel, said perforated bar covering the entire travel distance 100 plus 102. A pivot member 106 is pivotally arranged on the seat rail 82. On its lower portion, it has a guide for a catch rod 108. In the normal position of use, see FIG. 10, the pivot member 106 is positioned in such a manner that the catch rod 108 is located outside the perforated bar 84.

The first Bowden cable 54 is attached at its core to said pivot member 106. The sheath of the corresponding lower end region of said first Bowden cable 54 is supported by the seat rail 82. If the seat back 20 is tilted forward, the spacing between the free end of the core and the sheath decreases and the pivot member 106 is pivoted in the clockwise direction (FIG. 10) as a result thereof. On its rear end, the catch rod 108 has a catch pin 110 that corresponds to the catch peg 90 of the cradle solution. In that the pivot member 106 is pivoted, which also causes the catch rod 108 to pivot, the catch pin 110 moves into engagement with the perforated bar 84. If the seat is now displaced forward within the longitudinal adjusting device, the catch pin remains in the perforated bar. But if the release 42 is actuated and the seat back 20 is tilted backward, the pivot member 106 pivots the catch pin 110 out of engagement. The memory function is thus set.

In this second embodiment the following steps are carried out to know whether the vehicle seat is within the rear portion 100 of the travel distance or within the front portion 102 thereof: The lower end region of the second Bowden cable 56 detects the position of the catch rod 108. Its sheath is supported by the seat rail 82. The corresponding core is fastened to a sliding piece 112 capable of freely sliding along the catch rod 108. It is made of plastic material for example. The catch rod 108 is provided with a catch 114 for the sliding piece 112 which is positioned at a distance from the catch pin. Said sliding piece is only allowed to move between said catch 114 and a front stop 116 of the catch rod 108. Moreover, the catch rod 108 extends across an aperture 118 of a cross flange connected to the seat rail 82. The abutment for the sheath of the second Bowden cable 56 that has been described herein above is disposed in immediate proximity to the aperture 118. In the normal position of use (FIG. 9), said aperture 118 is located on the other side of the catch 114 as compared to the stop 116 described on the front side end of the catch rod 108. It substantially is the clear distance between the aperture 118 and the surface area of the sliding piece 112 abutting on the catch that determines the length of the rear portion 100 of the travel distance.

Figure 11:
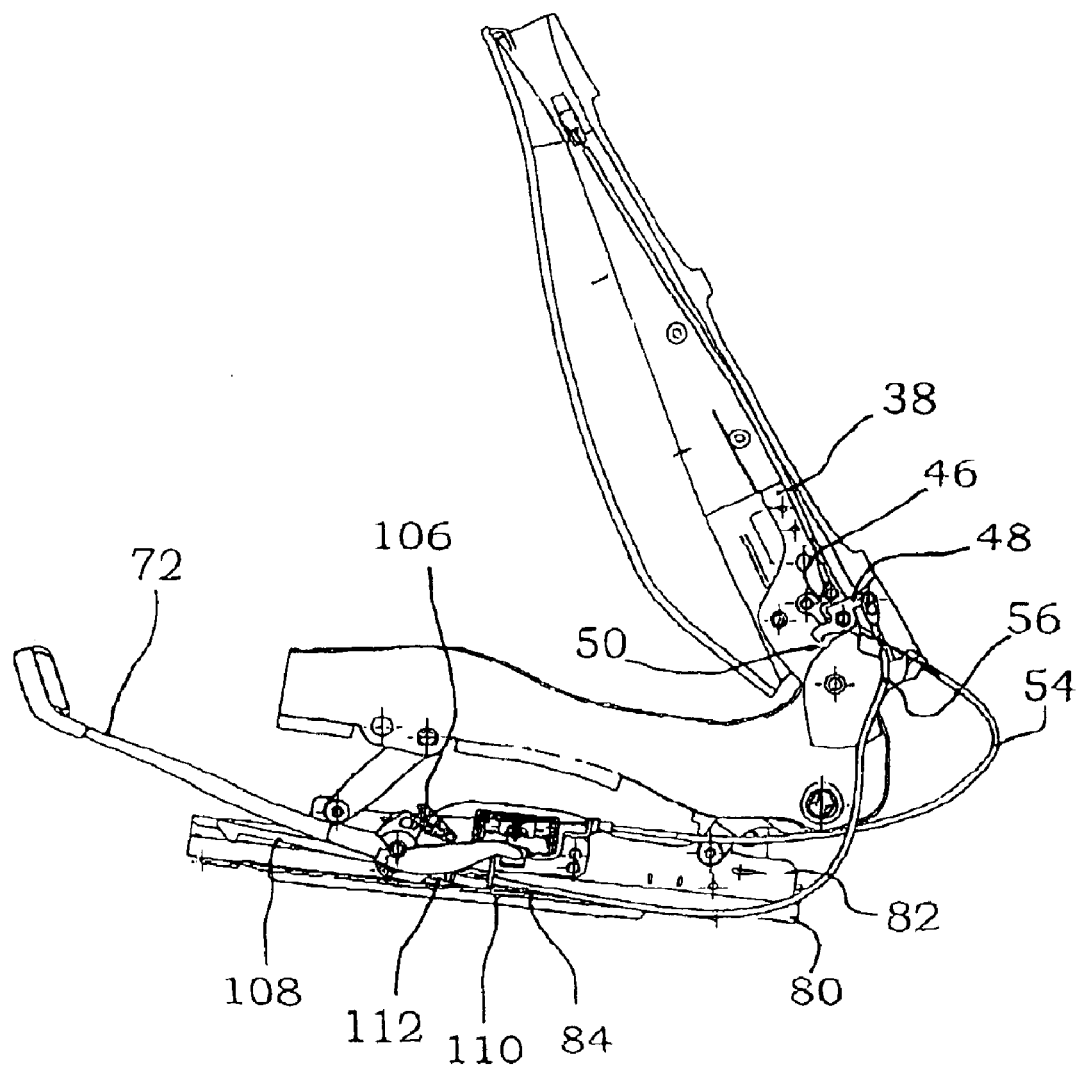
FIG. 11 is a side view of the seat like in FIG. 9 but now the seat back is tilted forward without the seat being displaced in longitudinal direction and FIG. 12 is a view of the seat like in FIG. 11 but now with the seat being displaced forward within the longitudinal adjusting device.
Figure 12:
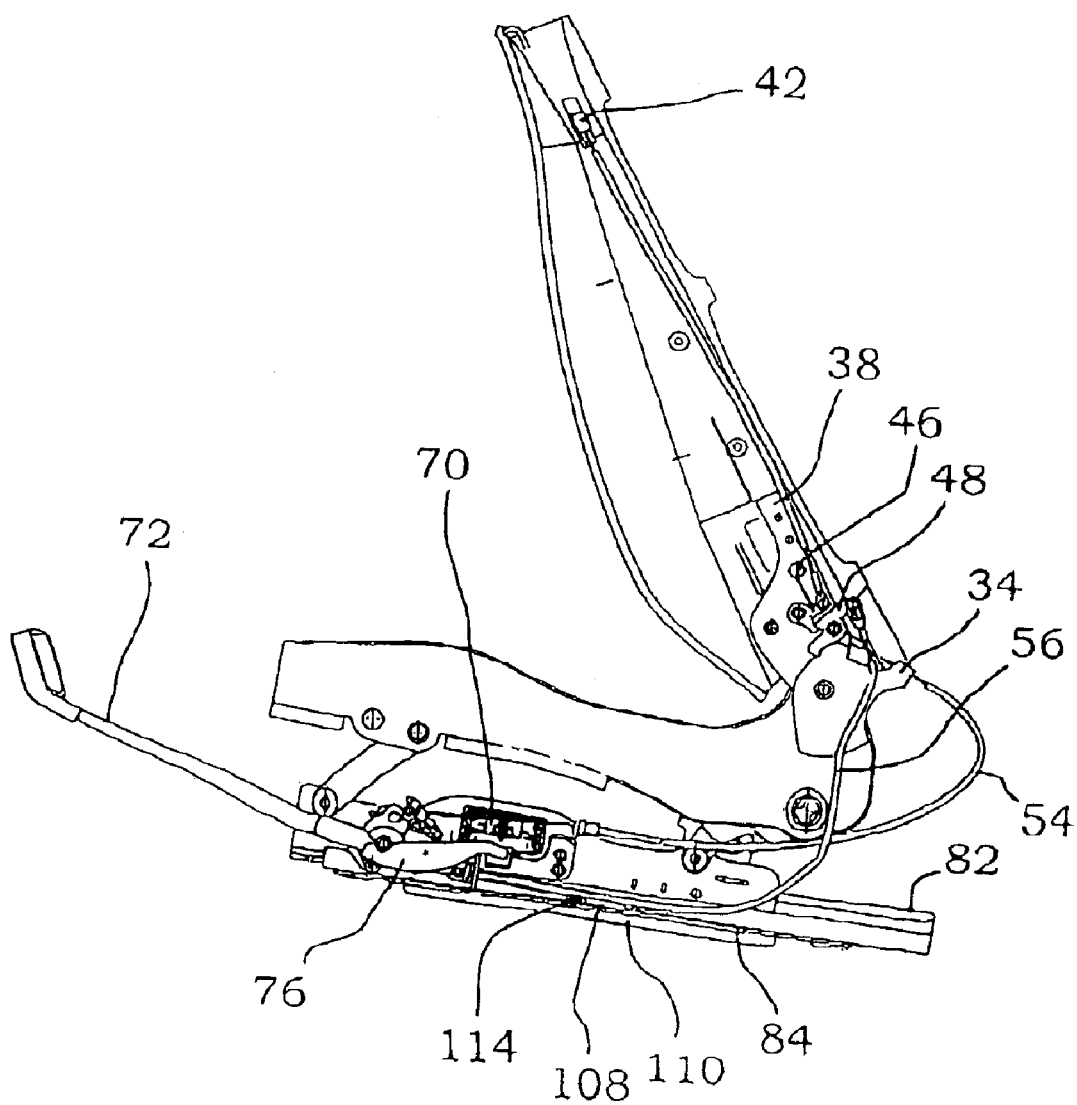

The following procedure is now performed: as soon as, starting from the position in FIG. 11, the seat is displaced forward in its longitudinal adjusting device, the aperture 118 gets nearer to the sliding piece 112 by the same distance. In the upper end region of the second Bowden cable 56, the core is also pulled out of the corresponding sheath by the same distance. This makes it possible for the holding arm 48 to pivot into the second locking position in the counter-clockwise direction (FIG. 12) as soon as the displacement motion has reached the front portion 102. The seat back 20 is now locked in a front position. If the seat is displaced farther forward within the longitudinal adjusting device, the sliding piece 112 slides along the portion of the catch rod 108 to which it is assigned, but the spacing between sliding piece 112 and aperture 118 is not reduced any further. The rim of the aperture 118 rather takes the sliding piece 112 along by pressing it forward.

On a return motion, the sliding piece 112 glides at first on the catch rod 108 until it reaches the catch 114. On displacing the seat farther backward, the core is again pulled out relative to the sheath in the lower end region of the second Bowden cable 56. This imperatively causes the holding arm 48 to be pulled out of the second locking position, i.e., the seat back may be brought back into the upright position.

The seat back 20 may be brought into the upright position any time by actuating the release 42. Like in the first embodiment, this actuation is always given priority.

The rod solution and the cradle solution may be claimed independently of one another also without the combination with the second locking position, i.e., with the second Bowden cable 56 and the corresponding parts such as 46, 48, 52, 58.

What is claimed is:

1. A forwardly displaceable vehicle seat intended for vehicles in which a rear seat is accessed through a side door assigned to the vehicle seat, comprising;
   a seat back;
   a seat carrier;
   a seat back joint arranged between said seat back and said seat carrier;
   a locking device assigned to said seat back joint and locking said seat back joint in a first locking position in a normal position of use of the vehicle seat;
   a longitudinal adjusting device provided with a stop unit and with a memory unit;
   a release, which is arranged on the seat back and is connected to, and cooperates with, the locking device, permitting displacement of the vehicle seat from the normal position of use into a forwardly displaced position, a forward displacement consisting of folding the seat back forward which allows the vehicle seat to be displaced forward in its longitudinal adjusting device; and
   a first transmission means disposed between said seat back and said longitudinal adjusting device and sets the memory unit on the one side and releases the stop unit on the other side when the seat back is tilted forward;
   wherein the locking device is provided with a second locking position in which the seat back joint is locked in such a manner that the seat back is retained in a forwardly tilted position and that there is provided a second transmission means which is arranged between locking device and memory facility and actuates the locking device in such a manner that the locking device is not capable of adopting the second locking position within a portion of the travel distance of the seat located at the back, starting from the normal position of use, and that the locking device is allowed to engage into a second locking position within a front portion of the travel distance, and
   wherein the locking device of the seat back joint has a holding arm that is arranged on a fitting part of the seat back joint, wherein there is provided a locking piece, which is arranged on another fitting part of the seat back joint and is in engagement with the holding arm in the second locking position and wherein the holding arm is connected to the second transmission means.

2. The vehicle seat according to claim 1, wherein the release is connected to a release anti of the locking device and wherein the holding arm, which is in engagement with the locking piece, is removed from engagement with said locking piece by pivoting the release arm.

3. The vehicle seat according to claim 1, wherein the seat portion of the travel distance is considerably shorter than the front portion, the rear portion being more specifically configured to be at most 10%, preferably at most 5% of the overall length of the travel distance.

4. The vehicle seat according to claim 1, wherein the memory unit is provided with a catch rod which is slidably guided in a pivot member and is provided, with a catch pin,
   wherein the pivot member is pivotably arranged on a seat rail of the longitudinal adjusting device, is connected to the first transmission means and cooperates with the stop unit, wherein the memory unit furthermore has a perforated bar adjacent the catch pin into which said catch pin may engage and which is connected to a bottom rail in engagement with the seat rail,
   wherein the memory unit furthermore is provided with a sliding piece connected to the second transmission means, wherein the catch rod is provided with
   a) a guide region for the sliding piece along which the sliding piece may slide relative to the catch rod and
   b) a rod catch for the sliding piece, wherein a rail catch for the sliding piece is provided in proximity to the catch rod and is connected to the seat rail and
   wherein the second transmission means is a Bowden cable that is arranged, at the one end region thereof, between sliding piece and rail catch.

5. The vehicle seat according to claim 4, wherein the distance between the rod catch and the rail catch is adjusted to the length of the rear portion of the travel distance.

6. The vehicle seat according to claim 1, wherein the memory unit is provided with a catch cradle, a perforated bar and a lever arrangement,
   wherein the catch cradle is arranged so as to be capable of travelling along the perforated bar and is provided with a catch peg which is elastically biased in a position of engagement by means of a peg spring,
   wherein the perforated bar is connected to a bottom rail of the longitudinal adjusting device,
   wherein the lever arrangement is disposed on a seat rail in engagement with the bottom rail,
   wherein the lever arrangement is connected to the first and to the second transmission means and wherein the lever arrangement cooperates with the stop unit and is provided with a memory lever that a) cooperates with the catch peg and actuates the same, and that b) takes the catch cradle along.

7. The vehicle seat according to claim 6, wherein, in the front portion of the travel distance, the memory lever is located outside the catch cradle and wherein, in the rear portion of the travel distance, the memory lever is in a position in which it is capable of cooperating with the catch cradle.

8. The vehicle seat according to claim 1, wherein at least one of the transmission means is provided with a Bowden cable.

9. The vehicle seat according to claim 1, wherein there is only one second transmission means for each vehicle seat.

* * * * *